(12) United States Patent
Mitra

(10) Patent No.: US 7,653,464 B1
(45) Date of Patent: *Jan. 26, 2010

(54) REGENERATIVE HYBRID SYSTEM FOR POSITION-ADAPTIVE SENSOR APPLICATIONS

(75) Inventor: Atindra K. Mitra, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 498 days.

This patent is subject to a terminal disclaimer.

(21) Appl. No.: 11/398,738

(22) Filed: Apr. 4, 2006

(51) Int. Cl.
*G01C 23/00* (2006.01)

(52) U.S. Cl. ............................. 701/3; 701/22; 701/36; 701/216; 701/220; 342/357.09; 342/42; 342/73

(58) Field of Classification Search ............ 701/3, 701/13, 33, 36, 207, 216, 220, 22; 340/991; 342/357.01, 357.09, 42, 59, 73, 21, 27, 61, 342/66

See application file for complete search history.

(56) References Cited

U.S. PATENT DOCUMENTS

| | | | |
|---|---|---|---|
| 6,163,681 A * | 12/2000 | Wright et al. | 455/66.1 |
| 6,173,159 B1 * | 1/2001 | Wright et al. | 455/66.1 |
| 6,653,970 B1 | 11/2003 | Mitra | |
| 6,690,318 B1 | 2/2004 | Tsunoda | |
| 6,724,340 B1 | 4/2004 | Carlos et al. | |
| 7,068,210 B1 * | 6/2006 | Mitra et al. | 342/63 |

* cited by examiner

*Primary Examiner*—Gertrude Arthur Jeanglaud
(74) *Attorney, Agent, or Firm*—AFMCLO/JAZ; Gina S. Tollefson

(57) ABSTRACT

A hybrid air-ground vehicle design that cycles through a regenerative energy phase during a ground-based trajectory. The regenerative ground-based trajectory, in turn, produces energy for purposes of implementing another air-based trajectory cycle. The design significantly improves the versatility and endurance of robotic position-adaptive sensor designs. The radar (or electro-optic) sensors on the platform perform surveillance operations during both the ground and air trajectories of the hybrid air/ground vehicle.

16 Claims, 4 Drawing Sheets

REGENERATIVE HYBRID SYSTEM FOR POSITION-ADAPTIVE SENSOR APPLICATIONS

RIGHTS OF THE GOVERNMENT

The invention described herein may be manufactured and used by or for the Government of the United States for all governmental purposes without the payment of any royalty.

CROSS REFERENCE TO RELATED APPLICATIONS

The present document is somewhat related to the commonly assigned patent application document "LOW-COST POSITION ADAPTIVE UAV RADAR DESIGN WITH STATE-OF-THE-ART COTS TECHNOLOGY", AFD 723, Ser. No. 11/070/403, filed Feb. 25, 2005, now U.S. Pat. No. 7,068,210 issued Jun. 27. 2006. The contents of this application are hereby incorporated by reference.

BACKGROUND OF THE INVENTION

Position-adaptive robotic sensor concepts for radar applications are known and have been investigated to a small degree in the prior art. Present-day combat scenarios often involve a foot soldier patrolling within hostile urban environments. The development of position-adaptive radar concepts allow for several advancements in the area of intelligent preparation for the battlefield by providing soldiers the capability of safely pre-surveying embedded urban canyons and obscured indoor environments for unforeseen adversaries and obscured weapons from a reasonable stand-off distance. This technology also allows for the continuous electronic surveillance of activities within an uncontrolled region and also for monitoring of suspicious materials transfers within uncontrolled regions of interest. In general, multi-platform position-adaptive UAV radar concepts allow for the acquisition of intelligence information in many important and challenging environments with obscured and embedded channels and allow for the safe preparation of an uncontrolled region-of-interest for day to day military operations. Position-adaptive multi-UAV radar is also a dual-use technology in the sense that many system configurations and geometries can be defined with important applications to commercial security and homeland defense.

FIG. 1 illustrates a prior art position-adaptive radar system concept for interrogating difficult and obscured targets in urban environments using low-altitude smart, or robotic-type, unmanned air vehicle (UAV) platforms. The UAVs are shown at 100 and 101 and the urban environment is shown at 102. A low-altitude position-adaptive platform is denoted as a "LUAV" and a high-altitude radiating platform as "HUAV." The system concept entails two modes. In mode 1, LUAVs perform real-time onboard computations of differential phase parameters, phase discontinuities, and amplitude signatures to position-adaptively isolate signal leakage points (e.g., between two buildings).

After the LUAV position-adaptively converges to an optimum location (at a leakage point), the system enters mode 2 (see FIG. 1). The mode 2 technique is based on modulating scattering centers on embedded objects 103 (denoted by the small black box in the figure) by implementing a fast trajectory on the HUAV as the LUAV hovers in front of an obscured channel. This fast trajectory on the HUAV generates a modulation signal that a smart LUAV can measure in a passive mode and analyze. Under this concept, the hovering LUAV measures the modulation signals and implements a set of real-time onboard computations to determine characteristics of embedded target that are non-line-of-sight to either the HUAV or the LUAV.

Position-adaptive radar system development efforts for future systems include analysis, simulations, and data collection efforts for interrogating indoor urban environments, tunnels, embedded cavities, and other challenging clutter environments. Position-adaptive sensor concepts for interrogating embedded objects-of-interest in challenging environments using electro-optic and laser sensors can also be formulated and investigated for advanced sensor development applications. Developing a hybrid air/ground position-adaptive UAV radar capability with regenerative energy sources addresses many of the limitations of existing UAV-based sensor systems due, for example, to energy-limited loiter and reconnaissance times within an embedded urban environment. In addition, a hybrid air/ground capability enhances the flexibility of a distributed multi-UAV system by allowing for a continuum of platform altitudes.

The present invention introduces a platform design that will significantly improve the versatility and endurance of future robotic or robotically-enhanced (partially autonomous) positive-adaptive sensor designs.

SUMMARY OF THE INVENTION

The present invention introduces a design that significantly improves the versatility and endurance of robotic position-adaptive sensor designs. These enhancements are accomplished by introducing a hybrid air/ground design where the system cycles through a regenerative energy phase during a ground-based trajectory. The regenerative ground-based trajectory, in turn, produces energy for purposes of implementing another air-based trajectory cycle. The radar (or electro-optic) sensors on the platform perform surveillance operations during both the ground and air trajectories of the hybrid air/ground vehicle.

It is an object of the invention to provide a position adaptive system that performs transmitting, receiving and processing a radar signal in real time both on the ground and in the air with power regeneration capability.

It is another object of the invention to provide a position adaptive sensor system with power regeneration capabilities.

It is another object of the invention to provide a position adaptive sensor system that regenerates power during ground-based surveillance operations for use in air-based surveillance operations.

These and other objects of the invention are achieved by the descriptions, claims and accompanying drawings and by a hybrid, position-adaptive radar sensing vehicle with power regeneration capability, comprising:

a vehicle with air and ground transport capability;

a close-range positional control radar system for transmitting, receiving and processing a radar signal in real time;

a systems control processor for interfacing said radar system with said positional control system and wherein said controls processor iteratively controls the location of the unmanned vehicle in real time; and means for vehicle power regeneration during ground-based trajectory wherein said ground-based power regeneration trajectory produces power for an air-based trajectory.

DETAILED DESCRIPTION

Figure 1:
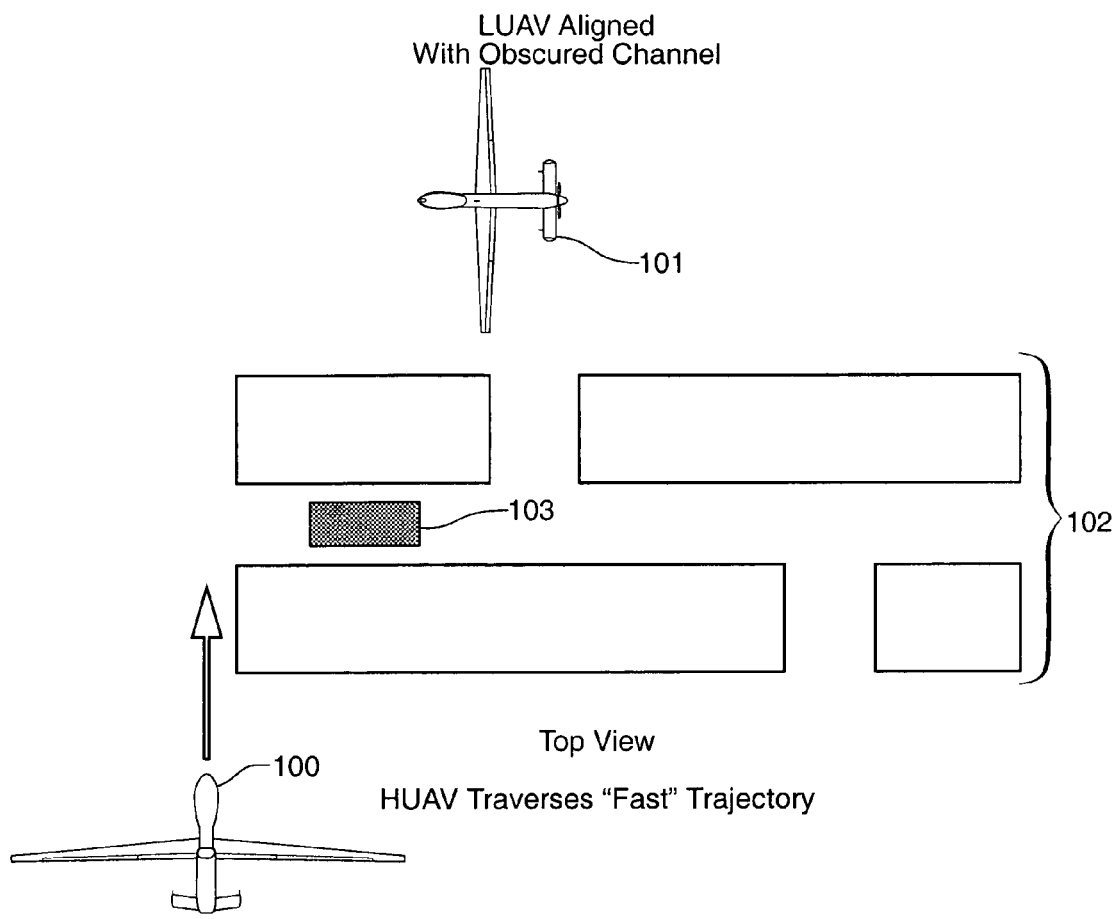
FIG. 1 shows a diagram of a prior-art position adaptive radar system for small unmanned air vehicle platforms.
Figure 2A:
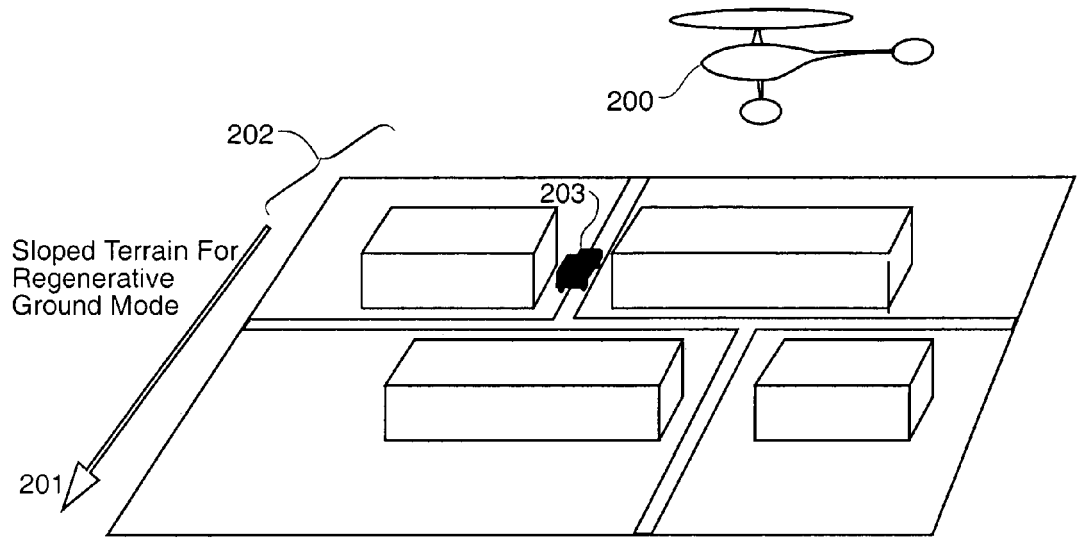
FIG. 2a shows a diagram for hybrid air/ground vehicles according to the arrangement of the invention.
Figure 2B:
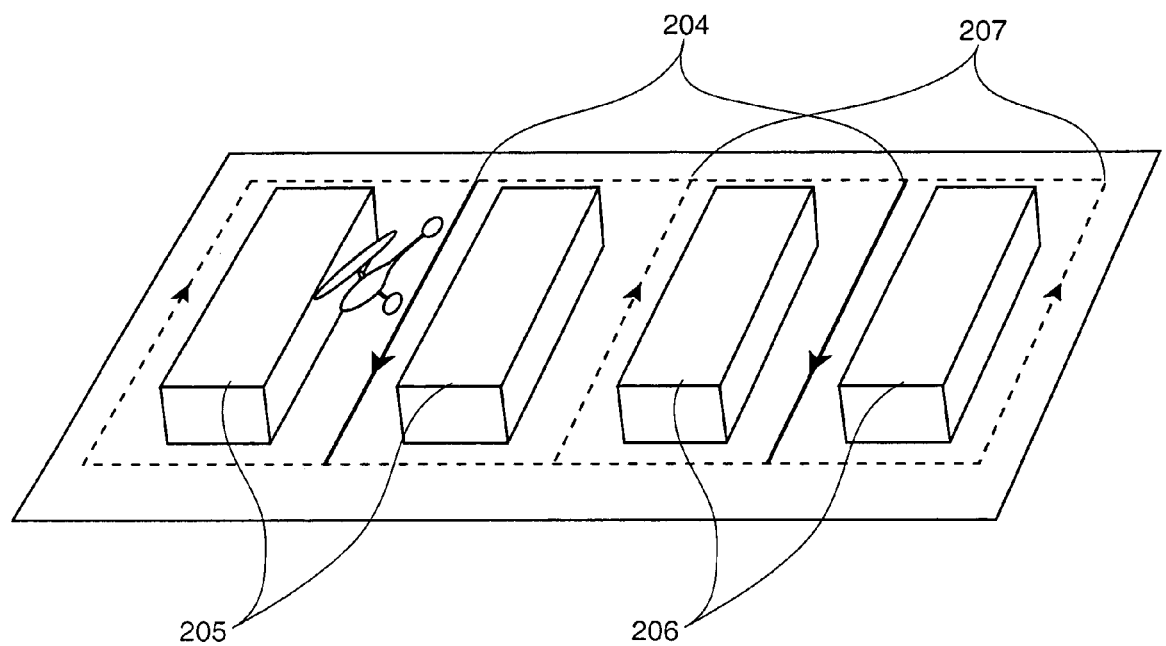
FIG. 2b shows a diagram illustrating the regenerative ground-mode feature of the invention.

FIGS. 2a and 2b illustrate preferred arrangements for the hybrid, regenerative air/ground vehicle concept of the invention. Developing a hybrid air/ground position-adaptive UAV radar capability with regenerative energy sources is significant because 1) the regenerative energy capability of the hybrid air/ground vehicle allows for lighter sensor package designs and more emphasis on advanced lightweight radar components while reducing the weight and size burden of the power system, 2) more elaborate interrogation geometries and sensor capabilities due to a dual air/ground platform, 3) and potentially longer surveillance times within an embedded region due to the self-contained energy generation/regeneration capabilities within a given embedded environment.

In FIG. 2a, a hybrid UAV/UGV 200 (Unmanned Aerial Vehicle/Unmanned Ground Vehicle), that is configured to function as a position-adaptive sensor, encircles an urban region 202 to locate potential objects of interest that may be located between buildings, one of which is illustrated at 203, or within the buildings. The hybrid vehicle 200 is shown as a helicopter configuration that hovers back and forth between buildings while transmitting, receiving and processing a radar signal in real time. The downward sloping arrow 201 on the left side of FIG. 2 denotes a region with descending terrain for purposes of regenerative ground mode operation.

FIG. 2b depicts a scenario that illustrates the regenerative ground mode in more detail. In FIG. 2b, the two solid lines 204 between the buildings, illustrated at 205 and 206 represent ground trajectories where the hybrid UAV/UGV rolls down a sloped terrain to convert gravitational potential energy into regenerative power for the position-adaptive sensors. This regenerative energy allows the hybrid UAV/UGV to also fly an airborne trajectory as illustrated by the dotted lines 207 in FIG. 2b.

Figure 3:
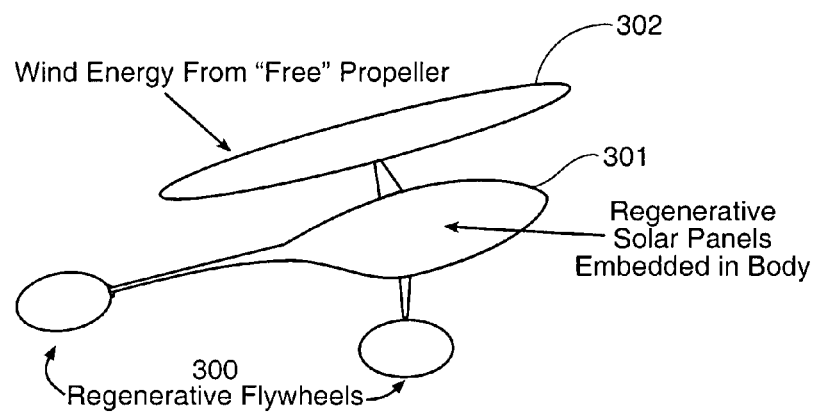
FIG. 3 shows a structure for hybrid air/ground vehicles according to the invention in regenerative ground mode.

As an example of this type of ground mode implementation, FIG. 3 illustrates a set of regenerative flywheels 300 that have the dual purpose of being used as wheels for ground mode operation as well as for the purpose of generating energy storage while traversing downward-sloping ground trajectories. Regenerative solar panels are shown at 301 in FIG. 3. Sample calculations and power estimates follow that demonstrate a design methodology that is based on evaluating trade-offs between various regenerative energy mechanisms such as flywheel, free-running propellers and other potential regenerative energy sources that can be incorporated into the intrinsic designs of integrated position-adaptive sensor platforms. Estimates for the power generation from the type of flywheel mechanism can be derived from the following basic equation for energy, E:

$$E = \frac{I\omega^2}{2} \quad \text{(Equation 1)}$$

Where I=moment of inertia and ω=rotational frequency.

Consider an example where a 50 kg hybrid UAV/UGV is in a regenerative ground mode over a section of terrain that slopes downward at 45 degrees over a 100 m path. The average velocity of the hybrid UAV/UGV can be calculated from Newton's second law as follows:

$$v^2 = v_o^2 + 2a(s - s_o) \quad \text{(Equation 2)}$$
$$= 2(4.9)(100)$$

v=30 m/s

Consider a second example where one of the front wheels/flywheels is designed for a mass of 2 kg, an outer radius of 0.5 m, and an inner radius of 0.05 meters. The inertia can be calculated as follows:

$$I = \frac{m(R_I^2 + R_O^2)}{2} \quad \text{(Equation 3)}$$

The rotational frequency of the 0.5 m flywheel over the 100 m downward-sloping path can be estimated as follows:

$$\omega = \frac{\text{number of flywheel rotations}}{\text{duration of regenerative ground-mode cycle}} \quad \text{(Equation 4)}$$
$$= \frac{100/2\pi(.5)}{100/(30)}$$
$$= 9.55 \text{ rad/s}$$

Evaluating Equation 1 with these sample parameters yields an energy estimate of about 11.5 J. The power from this flywheel mechanism can be estimated as follows:

$$P = \frac{E}{T} \approx \frac{11.5}{3.3} \approx 3.5 \text{ W} \quad \text{(Equation 5)}$$

As indicated in FIG. 3, regenerative hybrid UAV/UGVs can be designed by mounting "free running" propellers 302 on the UAV/UGV for purposes of implementing the regenerative ground-mode. This allows for energy re-generation via wind engineering mechanisms. For example, for a 100 m regenerative ground cycle over a 45 degree down-slope and a vehicle speed of 30 m/s, the following equation provides an estimate for wind power generation capabilities:

$$P_{prop} = 0.625 \text{ A v}^3 \quad \text{(Equation 6)}$$

where A is the cross-sectional area swept out by the propeller blades and v is the wind speed. For example, using a cross-sectional area of (2 m) (0.002 m) and a wind velocity of 30 m/s yields a propeller-driven regenerative power capability on the order of 65 W.

Figure 4:
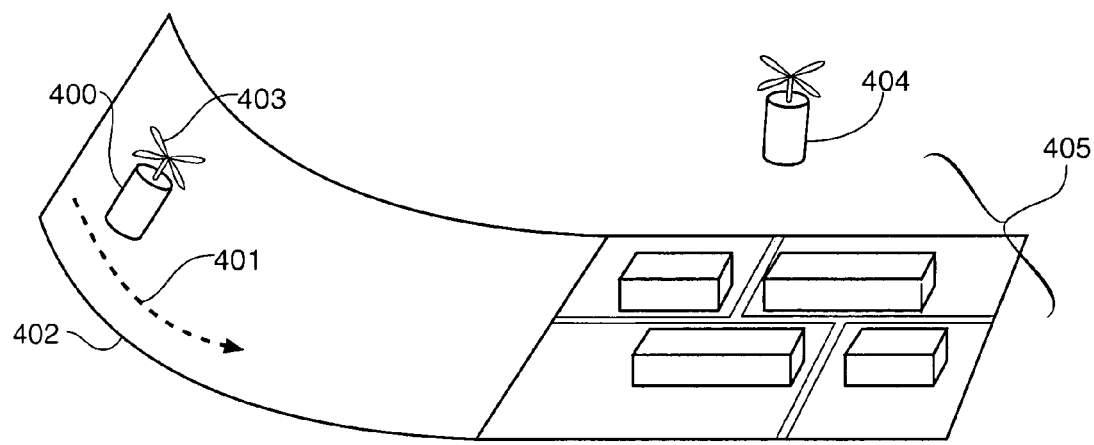
FIG. 4 shows an unmanned hybrid vehicle with a flying fan platform according to the invention.

In addition to the preferred arrangement of the invention set forth in FIG. 2, many other hybrid air-ground vehicle configurations can be developed based on these concepts. For example, micro-UAV platforms that are based "flying fan" configurations can be developed that "roll" down a hill during a regenerative ground mode and adaptively cycle back to an "upright" position during transition to an aerial mode. FIG. 4 illustrates a scenario with a "flying fan" platform 400 that rolls 401 down a hill 402 to implement a regenerative energy process. The gravitationally-induced rolling motion 401 causes the fan blades 403 to rotate and generate energy. Under this sample scenario, the platform then enters an airborne phase 404 (via exploitation of the regenerative energy from the rolling phase) to survey a region-of-interest 405.

Figure 5:
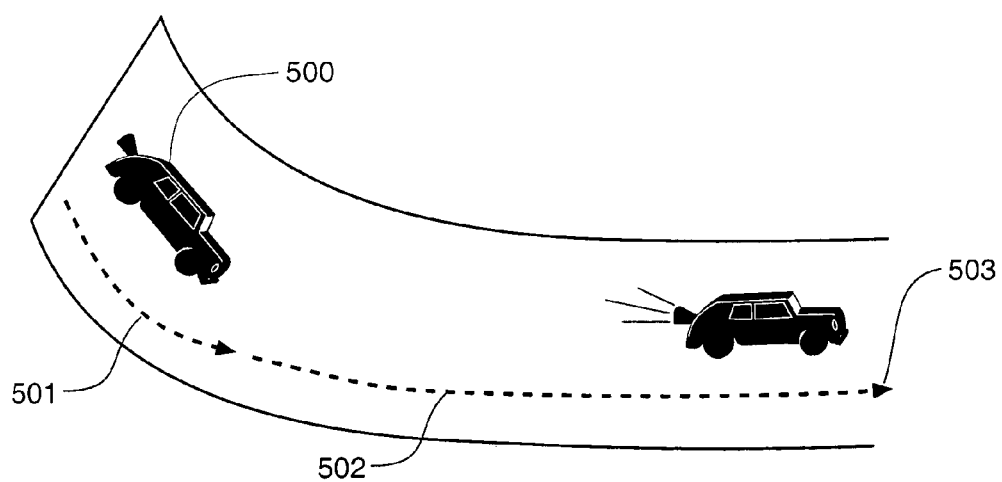
FIG. 5 shows a position-adaptive sensing armored personnel carrier with regenerative capability according to the invention.

Additional vehicle configurations worth consideration might include hybrid air/ground APC (Armored Personnel Carrier) vehicles for surveillance applications within a region of interest. For example, in a regenerative ground mode, APC personnel could gather sensor-based intelligence information over a small localized area while the regenerative system charges a set of thrusters. The charged thrusters could then propel the hybrid air/ground APC to a neighboring area of interest for more regenerative ground intelligence operations. FIG. 5 shows an armored personnel carrier according to the arrangement of the invention. FIG. 5 depicts a situation where an APC 500 exploits regenerative energy from a rolling phase 501 to develop thrusting forces. Under this notional scenario, these thrusting forces propel the APC 502 into a region of interest 503 for purposes of intelligence gathering and other operations.

A list of basic and advanced technologies that can be combined via the development of innovative energy hybridization methods to develop advanced hybrid regenerative air/ground vehicles include diesel fuel technologies, solar photovoltaic technologies, wind/propeller power technologies, micro turbine technologies, fuel cell technologies, small-scale nuclear reaction technologies, advanced heat conversion and geothermal technologies, biomass energy conversion techniques and small and large scale hydro-power. Future developments in enhancing the performance of regenerative hybrid air/ground vehicles as introduced in this disclosure may require innovative energy hybridization of some of the techniques in this list along with developments in advanced power electronics devices to provide efficient interfaces for purposes of implementing intelligent position-adaptive sensor platforms.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A hybrid, position-adaptive radar sensing vehicle with power regeneration capability, comprising:
    a vehicle with air and ground transport capability,
    a close-range positional control radar system for transmitting, receiving and processing a radar signal in real time;
    a systems control processor interfaced with said radar system for iteratively controlling said vehicle in real time to a location; and
    means for regenerating vehicle power; and
    wherein said means for regenerating vehicle power produces power during a ground-based trajectory for an air-based trajectory.

2. The hybrid, unmanned position-adaptive radar sensing vehicle with power regeneration capability of claim 1 wherein said vehicle is unmanned.

3. The hybrid, position-adaptive radar sensing vehicle with power regeneration capability of claim 2 wherein said vehicle is lightweight.

4. The hybrid, position-adaptive radar sensing vehicle with power regeneration capability of claim 2 wherein said vehicle with air and ground transport capability further comprises an unmanned helicopter configured vehicle.

5. The hybrid, position-adaptive radar sensing vehicle with power regeneration capability of claim 4 wherein said helicopter configured vehicle with air and ground transport capability further comprises an unmanned helicopter configured vehicle with a set of regenerative flywheels used as wheels for ground-based trajectory while traversing downward-sloping ground trajectories.

6. The hybrid, position-adaptive radar sensing vehicle with power regeneration capability of claim 4 wherein said unmanned helicopter configured vehicle with air and ground transport capability further comprises an unmanned helicopter configured vehicle with free-running propellers for wind power generation.

7. The hybrid, position-adaptive radar sensing vehicle with power regeneration capability of claim 2 wherein said vehicle with air and ground transport capability amber comprises a micro-unmanned fan configured vehicle wherein said micro-unmanned fan configured vehicle rolls down an incline causing the fan blades to rotate and generate energy.

8. The hybrid, position-adaptive radar sensing vehicle with power regeneration capability of claim 1 wherein said vehicle with air and ground transport capability further comprises an armored personnel carrier.

9. The hybrid, position-adaptive radar sensing vehicle with power regeneration capability of claim 8 wherein said armored personnel carrier includes thrusters that charge in a regenerative ground mode and said thrusters propel said vehicle to a neighboring area of interest.

10. A hybrid, unmanned, position-adaptive radar sensing vehicle with power regeneration capability, comprising:
    an unmanned helicopter configured vehicle with air and ground transport capability;
    a close-range monostatic positional control radar system for transmitting, receiving and processing a radar signal in real time;
    a systems control processor interfaced with said radar system for iteratively controlling said unmanned helicopter configured vehicle in real time to a location; and
    a set of power regenerative flywheels on said helicopter configured vehicle used as wheels for ground-based trajectory while traversing downward-sloping ground trajectories;
    wherein said ground-based power regeneration trajectory produces power for purposes of implementing an air-based trajectory.

11. A hybrid, position-adaptive radar sensing system with power regeneration capability, comprising the steps of:
    providing a vehicle with air and ground transport capability;
    transmitting, receiving and processing a radar signal in real time using a close-range positional control radar system;
    interfacing said positional control radar system with a systems control processor for iteratively controlling said vehicle in real-time to a location; and
    regenerating vehicle power during a ground-based trajectory for use in a subsequent air-based trajectory.

12. The hybrid, position-adaptive radar sensing system with power regeneration capability of claim 11 wherein said providing step further comprises providing an unmanned vehicle with air and ground transport capability.

13. The hybrid, position-adaptive radar sensing system with power regeneration capability of claim 12 wherein said providing step further comprises providing an unmanned helicopter-configured vehicle with air and ground transport capability.

14. The hybrid, position-adaptive radar sensing system with power regeneration capability of claim 12 wherein said regenerating step further comprises regenerating vehicle power using a set of regenerative flywheels while traversing downward-sloping ground trajectories wherein power is generated for use in a subsequent air-based trajectory.

15. The hybrid, position-adaptive radar sensing system with power regeneration capability of claim 12 wherein said regenerating step further comprises regenerating vehicle power using an unmanned helicopter configured vehicle with free-running propellers for wind power generation.

16. The hybrid, position-adaptive radar sensing system with power regeneration capability of claim 12 wherein said regenerating step further comprises regenerating vehicle power using a micro-unmanned fan configured vehicle wherein said micro-unmanned fan configured vehicle rolls down an incline causing the fan blades to rotate and generate energy.

* * * * *